March 15, 1966 W. H. SMYERS ETAL 3,240,662

IMPREGNATED REINFORCING ELEMENT BONDED TO AN OXIDE COATING ON A COPPER FOIL

Filed Jan. 23, 1961

William H. Smyers
Gregory J. Linden
Hadden Clark
INVENTORS
Ober C. Slotterbeck, Deceased
BY Lealia G. Slotterbeck, Executrix
BY
PATENT ATTORNEY

United States Patent Office 3,240,662
Patented Mar. 15, 1966

3,240,662

IMPREGNATED REINFORCING ELEMENT BONDED TO AN OXIDE COATING ON A COPPER FOIL

William H. Smyers, Westfield, Hadden Clark, Plainfield, and Gregory J. Linden, Union City, N.J., and Ober C. Slotterbeck, deceased, late of Clark, N.J., by Lealia G. Slotterbeck, executrix, assignors to Esso Research and Engineering Company, a corporation of Delaware Filed Jan. 23, 1961, Ser. No. 84,461
8 Claims. (Cl. 161—225)

The instant invention relates to a process for bonding a metal foil to a polydiolefin resin with a reinforcing element therein. More particularly, it is concerned with the unitary panel therefrom which can be employed in printed circuits for television and the like.

It is known that a metal foil, e.g., copper foil, can be united with a thermosetting resin, e.g., phenolic resin, with or without an adhesive therebetween (U.S. Patent Nos. 2,606,855; 2,662,045; 2,716,268; and 2,757,443). It is also known as per U.S. Patent No. 2,701,780 to adhere two metallic layers together by incorporating a liquid polydiolefin therebetween and subsequently curing to provide desired end product.

In the past, however, problems have occurred when it was attempted to bond an oxide-coated copper foil to a polydiolefin resin. If the foil was placed on glass cloth impregnated with an uncured polydiolefin liquid mix, the upper oxide coating on the copper foil was contaminated. This precluded the removal of the oxide from the final foil-laminate product. Furthermore, a bond could not be formed if the foil was combined with a hard, solid laminate which had been completely cured.

Figure 1:
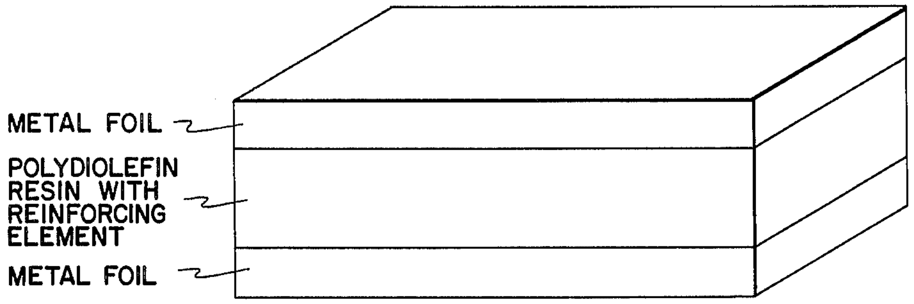

It has now been discovered that these seemingly insurmountable problems can be overcome by utilizing a polydiolefin mix which has been cured to a B-stage product or a graft polymer. Thus, in accordance with one embodiment herein, a resinifiable mix is prepared with a polydiolefin therein and this mix is used to impregnate a reinforcing element with subsequent curing to form a B-stage laminate. Alternatively, the mix can be cured to a graft polymer and a reinforcing element is impregnated therewith to provide a graft polymer prepreg. An oxidized metal foil is then bonded to this B-stage laminate or graft polymer prepreg and the panel therefrom is etched to remove the oxide from the outside of the foil. FIGURE 1 illustrates this concept.

In a second feature of the present invention, the oxide metal foil is precoated with a bondable polymer adhesive, such as a graft polymer polydiolefin resin, a B-staged polydiolefin resin, or a polyolefin, e.g. polyethylene. This coated foil is then bonded to the polydiolefin laminate as heretofore described. Furthermore, this invention has a third embodiment which is to bond the above precoated foil to materials such as paper, cloth and wood.

The curable polymers included in the resinifiable mix of this invention are prepared from conjugated diolefins, which have 4 to 6 carbon atoms per molecule, e.g. butadiene, hexadiene, isoprene, dimethyl butadiene, piperylene, and methyl pentadiene. Such diolefins may be copolymerized with minor amounts of ethylenically unsaturated monomers, e.g. styrene, acrylonitrile, methyl vinyl ketone, or with styrenes having alkyl groups substituted on the ring, e.g. paramethyl styrene and dimethyl styrene. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymers of butadiene with styrene. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having an —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises when tested as a 50% solution in Varsol. The preparation of this oil in the presence of an alkali metal or peroxide catalyst is described in U.S. Patents 2,762,851 and 2,586,594, which are incorporated herein by reference.

Besides the curable polydiolefin heretofore described, this resinifiable mix may also contain other monomeric crosslinking agents. Such monomers include the vinyl aromatics, such as styrene, the vinyl toluenes, the dimethyl styrenes, the halogenated styrenes, e.g. 2,4-dichlorostyrene; acrylic and methacrylic acid esters of monohydric alcohols, such as butyl methacrylate; alkyl fumarates, such as diethyl fumarate; and allyl esters, such as diallyl phthalate; and vinyl esters, such as vinyl stearate; an acrylic acid ester of a polyhydric alcohol, and mixtures thereof. These additional crosslinking agents may be present within the range of 0 to 70% of the curable liquid mix, preferably 30 to 50%.

A catalyst is also incorporated in the resinifiable mix within the range of 0.5 to 10 parts, preferably 2 to 4 parts. The catalyst is advantageously a free radical or peroxide type such as dialkyl or aralkyl peroxides, e.g., dicumyl peroxide and ditertiary butyl peroxide; and alkyl perester peroxides, e.g. ditertiary butyl diperphthalate and tertiary butyl perbenzoate. A mixed catalyst consisting of dicumyl peroxide and ditertiary butyl peroxide is preferred. Benzoyl peroxide may also be employed in the mix, preferably in 0.5 to 1.0% concentration.

It may be also advantageous, although optional, to incorporate a hindered phenol into the aforementioned resinifiable polymeric mix. A preferred hindered phenol, 2,6-di-t-butyl para cresol, can be employed within the range of 0 to 2 parts per 100 parts of resinifiable mix.

It is also feasible herein to include 1 to 10 parts of a difunctional polyolefinic compound, e.g. divinyl benzene, in the resinifiable monomeric mix. The divinyl benzene type compounds have the general structure as indicated herebelow:

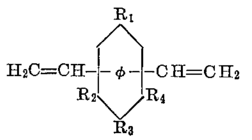

wherein $R_1$, $R_2$, $R_3$, and $R_4$ are each independently selected from the group consisting of hydrogen, halogens, alkyl groups, and a vinyl group; and $\phi$ is an aromatic nucleus such as that of benzene, naphthalene, biphenyl, and phenanthrene. Furthermore, it is within the purview of the instant invention to add to the mix 0.5 to 2.0 parts of natural rubber and/or synthetic polyisoprenes.

The reinforcing elements that are applicable to this invention include such items as mineral materials, e.g. glass fiber, asbestos, mica, rock, and celite; vegetable materials, e.g. cotton, linen, rayon, and silk; organic materials, e.g. hair, nylon, and Orlon; and metallic materials, e.g. iron, aluminum, and copper. Reinforcing elements generally comprise 80% by weight of the reinforced plastic, preferably 35 to 80%. However, the preferred material is glass fiber. In accordance with this invention, glass fiber is defined as any fibrous glass unit to include filament yarns rovings, reinforcing mats, stable yarns, woven fabrics, and chopped fibers. A protective size may be applied to glass fibers. Examples of sizes which can be used are as follows: polyesters; polyvinyl acetate; rubbers, such as the polyisoprene, copolymers of isobutylene with isoprene, and copolymers of butadiene with styrene. It is preferable to remove the sizing in many cases prior to contacting the glass with the resin. It is within the scope of this invention to use glass fiber which has been treated with an unsaturated organic halo silane, having the formula $R_nSiX_{4-n}$ wherein R is vinyl or allyl group, $n$ is a positive integer equal to 1, 2, or 3, and X is halogen. It is also possible, although not essential to incorporate 0.1 to 5 parts of a silane ester in the resinifiable mix which has the general formula $R_nSi(OR_1)_{4-n}$, wherein R is an unsaturated group, e.g. vinyl, allyl, or methallyl group; $n$ is a positive integer equal to 1, 2, or 3; and $R_1$ is an alkyl or aryl group or substitutes thereof. It is believed that the above-described silanes react with the hydroxyl groups on the glass surface. The unsaturated or vinyl portion of the molecule, bound to the glass through the silicon atom, reacts with the polymer during the curing step, thus effectively bonding the curable polymer and the glass fiber.

In the first embodiment, reinforcing elements are laminated with the aforementioned resinifiable polymer mix. A laminate, herein, is defined as a composite mass of a reinforcing agent and a thermosetting resin. This, therefore, includes layers of cloth and resin; fibers embedded in a resin; and fibers saturated with resin and formed into a hollow cylindrical pipe. Accordingly, lamination can be accomplished by any known procedure. For example, the resin mix can be combined with glass cloth by brush impregnation; by being poured into the center of several plies of dry cloth assembled on cellophane-covered glass plate; by spray up with chopped roving; and by dipping the cloth into the resin mix.

Thus, one method used in the manufacture of solid rectangular sheets, is to form layers of curable polymer mix and glass fiber. After the desired thickness is obtained, the sheet is cured to a B-stage product. Another method can be used for the manufacture of cylindrical hollow pipes. Glass fibers can be dipped in the curable polymer mix and wound about a steel mandrel. The fiber rovings, e.g. glass fibers, are wound at an angle to the axis of the mandrel circumferentially in superimposed layers to form a peripheral shell of the pipe. After the desired shape is obtained, the wrapping is cured to form a B-stage pipe.

More specifically, the reinforcing element with the resinifiable polymeric mix thereon as described above is then partially cured to a B-stage product. This can be accomplished in any known manner, but a preferred procedure is to place the mix in a press mold and bake at a temperature range of 250° to 350° F., preferably 265° to 335° F., for between 1 minute and 2 hours, preferably under 30 to 200 p.s.i.g. Thin sections (1/64 inch) are partially cured at higher temperatures for shorter periods of time, e.g. 1/4 to 60 minutes, at 300° to 500° F. in air-circulating over. This curing procedure is different from the one used in preparing a completely cured resin. A hard resin can be obtained by varying the temperature inversely with time. For example, at a low temperature, e.g. 270° F., a long time is required to produce a completely cured resin, e.g. 24 hours. Similarly, at a high temperature of 350° F., a short time, e.g. 60 minutes, is required. However, in this invention, a relatively low temperature and a relatively short time are employed; and, therefore, only a partially cured resinifiable mix is obtained. This partially cured B-stage product is not the same as a completely cured (hard) resin since the chemical and physical properties are inherently different as shown below.

| Physical properties | B-stage | Completely cured |
|---|---|---|
| Hardness, Shore D (5 sec. yield): | | |
| Resin | 2-40 | 80-97 |
| Resin with reinforcing agent, e.g. random glass fibers | 8-60 | 82.98 |
| Extrusion-parallel plates at 200 p.s.i., percent | 30-500 | 0-0.5 |
| Mold-ability (qualitative) | (1) | None |
| Thermoplasticity-hardness: Decrease for 75 to 350° F. range (Shore D units) | 3-25 | 30-45 |
| Flexural strength, p.s.i.×10³: Reinforced resin with random glass fibers | 0.1-15 | 18-35 |
| Chemical properties: Swelling (weight gain after 2 hrs. exposure to $CCl_4$ at 75° F.), percent | 50-200 | 0.0 |

[1] Good to excellent.

Alternatively, the aforementioned resinifiable mix can be cured to form a graft polymer by heating at a temperature between 200° and 300° F., preferably 240° and 275° F. for 15 to 320 minutes. The graft polymer is not the same as a B-stage partial cure and/or a complete cure. The graft polymer has only two dimensional crosslinking whereas the B-stage has three dimensional crosslinking. Furthermore, the graft polymer is soluble in hydrocarbon solvents, e.g. toluene, xylene, close-cut naphthas, and Varsol; in contrast, the B-stage is not soluble in these compounds. The comparison of properties of the three stages are demonstrated herebelow.

| Graft polymer | B-stage | Complete cure |
|---|---|---|
| Soluble in solvents. Viscosity between 1 and 50 poise at 50% NVM. | Soft gel, swells in solvents and therefore not soluble in solvents. | Hard solid, affected very slightly by, or inert to, solvents. |

The reinforcing elements, e.g. paper and cloth, in this alternative procedure can be impregnated with the graft polymer and dried in an air circulating oven at a temperature of room temperature to 325° F. for 30 seconds to 2 hours, e.g. 4 minutes at 250° F. A prepreg is obtained therefrom which usually is not tacky and is adaptable for being laminated in an open mold to provide a reinforced plastic therefrom. Depending upon the conditions employed this prepreg can be a dried graft polymer, e.g. with a temperature of 250° F. and below, or a B-stage product, e.g. with a temperature above 250° F.

The B-stage laminate or the prepreg alternative is subsequently bonded to an oxidized metal foil by placing the two components in a press mold and heating at about 250° to 400° F., preferably 300 to 350° F. inversely for 5 minutes to 24 hours, preferably 30 minutes to 2 hours. This metal foil can have a thickness of 0.1 to 5.0 mils, although a thickness of 1 to 2 mils is generally employed. As defined in the instant invention, the oxidized metal foil is a highly conductive metal which consists of an extremely thin, readily deformable panel, section, strip or ribbon of a non-ferrous, highly conductive metal such as copper or aluminum foil. The metal may contain a reasonable proportion of an alloying ingredient, being of itself a product in roll or like form as an article presently available in commerce. For the best practice of the present improvements, the metal foil is regarded as a metal of such thinness and temper as to be readily shaped, formed or manipulated by light pressure applied thereto, for example, by digital pressure, and of such gauge that the sheet material may be applied to moderately irregular surfaces, with certain and ready conformity to the relatively high and low portions of such irregular surface. A further criterion of the best suitability of the metal foil for present purposes is its wrinkling characteristic, i.e. the foil is preferably of such nature that it will accept a moderate out-of-plane deformation, without tearing, perforating or ripping, so that it will conform to relatively rough mating surfaces of a joint, without projection of the peaks of such surfaces through the foil.

The following procedure is suitable for providing an oxide coating on copper foil for printed circuits. The copper foil (1–2 mils in thickness) is cleaned by treating with an acid mixture of: water, 64 parts; $H_2SO_4$ (95%), 64 parts; $HNO_3$ (70%), 32 parts; HCl (38%), 1 part; and by rinsing with preferably distilled water. Subsequently, this cleaned foil is placed in solution of Ebanol C, (Enthone, Inc., New Haven, Connecticut), 1.5 lbs. per gal. $H_2O$, for 20 minutes at 100° C. (U.S. Patents 2,364,993; 2,460,896; 2,460,898; and 2,481,854; rinsed in water; and dried to obtain oxide-coated copper foil, which has a smooth black coating of copper oxide on each side.

After the metal foil has been bonded to the laminate, the oxide on the outer surface of the metal is removed therefrom. This can be accomplished by etching in a 5 to 15%, e.g. 10% solution of $FeCl_3$, or dilute $H_2SO_4$, HCl, or the like at a temperature range of 50 to 100° C. for 1 to 10 minutes until the black oxide coating is etched off to provide clean metal, e.g. copper on the outer side which is the one not bonded to the laminate. Subsequently, this product can be rinsed with water and dried.

Thus, in accordance with this invention, an end product is formed in which there is a strong bond between the metal foil and the laminate component. Furthermore, the oxide is removed from the exterior surface of the metal foil and this foil-laminate panel can now be successfully employed commercially in making television printed circuits.

As per the second embodiment, the oxide metal foil can be precoated with an adhesive prior to its bonding to the polydiolefin laminate. This adhesive, if employed, generally has a thickness between 0.1 and 10.0 mils, preferably 0.5 and 5.0 mils. It is possible to utilize the aforementioned graft polydiolefin polymer of B-stage resin, per se, as the adhesive layer. However, preferably this adhesive is a polyolefin. A polyolefin, as defined herein, is made from a monomer which contains 2 to 12 carbon atoms per molecule, e.g., polyethylene of low density or high density, polypropylene, polybutene, polyheptene, styrene-isobutylene copolymers, chlorosulfonated polyethylene, and the like. The polyolefin, polyethylene, being preferred, can be prepared by any known method. A suitable method is the polymerization of ethylene at low pressures, e.g., 0 to 500 p.s.i.g., and low temperature, e.g., 0 to 100° C., in the presence of a catalyst. The catalysts used in this polymerization reaction are solid, insoluble reaction products obtained by reducing a reducible heavy transition metal compound, the metal component of which is taken from groups IVB, VIB, or VIII or manganese with a reducing organo-metallic compound of an alkali, alkaline earth, rare earth, or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR′AlX wherein R, R′, and X preferably are alkyl groups from 2 to 8 carbon atoms, although X can be hydrogen or halogen, preferably chlorine. In addition to the catalyst, an inert hydrocarbon solvent, which is preferably a $C_3$ to $C_{18}$ paraffin, e.g. isopentane, n-heptane, and the like, may be used in the polymerization. The end product, e.g. polyethylene, generally has a molecular weight in the range of 12,000 to 500,000 or more. These polyolefins are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference. This invention is also applicable to low-density polyolefin, made by polymerization at about 100 to 400° C., under high pressure, e.g. 500 to 3,000 atmospheres, and preferably with a controlled trace of oxygen as catalyst, having a molecular weight above 1,000, preferably 5,000 to 30,000, e.g. 20,000.

If desired, the oxide-coated copper foil can have applied thereto on one side first a layer of polyethylene and then a coating of polydiolefin prepolymer solution and dried; or first a layer of polypropylene and then a layer of polyethylene.

With respect to a third embodiment, the oxidized metal foil can be coated with one of the adhesives, e.g., polyethylene, as demonstrated above. After the oxide has been removed in accordance with the described techniques, the coated foil can be bonded directly to such materials as paper, cloth, and cellophane, which is 0.1 mil to 10 mils in thickness, or wood and ceramics of greater thickness, e.g. up to two inches or more. This is accomplished by hot pressing or hot rolling if the polymer layer is thermoplastic; or by hot press curing if the polymer layer is or contains a curable polydiolefin resin in a B-stage or prepolymer condition.

It is also within the purview of this invention to utilize in a foil-laminate printed circuit for televison a metal foil that is not oxidized, e.g., copper foil, but which has been previously coated with a halosulfonated polyolefin. Furthermore, it is also possible in the instant invention to coat either oxidized or unoxidized metal with a polydiolefin described herein which has been air blown to incorporate up to 20%, e.g., 8 to 16% oxygen in its structure, as per U.S. Patent No. 2,895,979.

The following examples are submitted to illustrate but not to limit this invention. Unless other indicated, all parts and percentages in the specification are based upon weight.

EXAMPLE I

A polymeric oil was provided from the compounds indicated herebelow:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 Kauri-Butanol value (reference scale: Benzene-100 K.B. value,, n-heptane 25.4 K.B. value).

[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poise at 50% NVM in Varsol solution and the nonvolatile portion thereof had an average molecular weight of about 8,000.

A resinifiable mix was prepared with the above copolymer and various other components as indicated herebelow:

| Compound: | Parts by wt. |
|---|---|
| Butadiene-styrene (80–20) copolymer [1] | 50 |
| Styrene | 50 |
| Divinyl benzene (DVB) | 2 |
| Benzoyl peroxide (BPO) | 0.25 |
| Dicumyl peroxide (Dicup) | 2 |
| Di-t-butyl peroxide | 1 |
| Crepe rubber | 2 |

[1] 4,600 poise/77° F. made by polymerization with sodium catalyst.

Two sandwich type, 10" by 10" by 1/8", panels were made, having a thick polyethylene center layer A between two layers B and B' of glass cloth-reinforced resin, and thin cover layers C and C' of polyethylene. An outer oxide-coated copper fail was bonded to one side for use in making printed circuits for TV (television), etc. These panels comprised the following layers:

| Layer | Thickness (in mils) | |
|---|---|---|
| | Panel 1 | Panel 2 |
| D—Oxide-coated copper foil | 2 | 2 |
| C—High density (HD) polyethylene | 8 | 20 |
| B—Glass cloth resin | 18 | 18 |
| A—HD polyethylene | 72 | 48 |
| B'—Glass cloth resin | 18 | 18 |
| C'—HD polyethylene | 8 | 20 |

Figure 2:
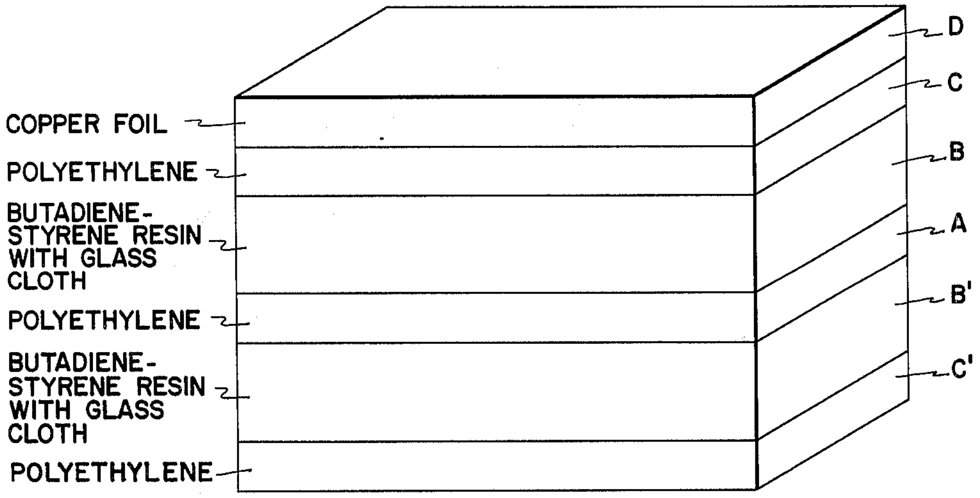

The layers B and B' each comprised three plies of No. 128 glass cloth impregnated with the wet resin mix heretoforce described and cured to a B-stage product at a temperature of 265° F. for 6 minutes at about 100 p.s.i. The entire assembly of layers was then press cured in a 1/8" mold for 40 minutes at 325° F. and 100 p.s.i., and found to be excellently bonded throughout, as per FIGURE 2.

EXAMPLE II

Example I was repeated except that prepreg glass cloth was prepared by pre-impregnating the glass cloth with a resinifiable mix comprising polybutadiene (about 800 poise/77° F. made by polymerization with sodium catalyst) styrene and divinyl benzene, 40 parts by wt.; xylene, 30 parts by wt.; toluene, 30 parts by wt.; dicup, 2.5 parts by wt.; silane, 0.3 part by wt.; PX–441 (2,6,-di-t-butyl para cresol), 0.05 part by wt.; and oven dried at 250° F. for 4 minutes. This prepreg was used in layers B and B'. In Example II, the oxide-coated copper foil layer D was pre-bonded to polyethylene layer C at 390° F. for 10 minutes. Curing this laminate assembly for 40 minutes at 325° F. produced a panel with a superior bond.

EXAMPLE III

The laminates of Examples I and II, after etching off the outer oxide coating by hot aqueous $FeCl_3$, rinsing and drying, had good copper foil bond strength and excellent electrical properties, as shown in the following tables:

*Table I*

[Peel strengths of copper foil on polyethylene-coated panels.]

| Example | Peel strength (lbs./inch.) | | |
|---|---|---|---|
| | Panel 1 Ex. I | Panel 2 Ex. I | Panel Ex. II |
| Tests at room temperature: | | | |
| Maximum | 10.8 | 14.0 | 20.0 |
| Minimum | 9.5 | 11.4 | 17.9 |
| Average | 10.2 | 13.0 | 18.2 |
| Tests at 70° C.: | | | |
| Maximum | 9.7 | 16.1 | 20.4 |
| Minimum | 8.5 | 6.1 | 16.6 |
| Average | 9.2 | 12.0 | 18.7 |

*Table II*

[Electrical properties of polyethylene-coated panels having copper foil on one side]

| | Dry | | | Wet | | |
|---|---|---|---|---|---|---|
| | Dielectric constant K | | Dissipation factor D | Dielectric constant K | | Dissipation factor D |
| Direction | ⊥ | ‖ | ⊥ | ⊥ | ‖ | ⊥ |
| Panel 1 | 2.80 | 3.4 | 0.0005 | 2.78 | 3.3 | 0.0008 |
| Ex. I | 2.75 | 3.2 | 0.0007 | 2.75 | 3.3 | 0.0009 |
| | ------ | 3.2 | ------ | ------ | 3.3 | ------ |
| | ------ | 3.3 | ------ | ------ | 3.2 | ------ |
| Average | 2.78 | 3.28 | 0.0006 | 2.77 | 3.28 | 0.0009 |
| Panel 2 | 2.71 | 2.4 | 0.0008 | 2.71 | 2.7 | 0.0011 |
| Ex. I | 2.71 | 2.7 | 0.0008 | 2.71 | 3.0 | 0.0010 |
| | ------ | 2.6 | ------ | ------ | 2.6 | ------ |
| | ------ | 2.7 | ------ | ------ | 3.0 | ------ |
| Average | 2.71 | 2.60 | 0.0008 | 2.71 | 2.83 | 0.0011 |
| | ------ | 3.2 | 0.0007 | 2.74 | 3.2 | 0.0014 |
| Panel | 2.73 | 3.3 | 0.0008 | 2.74 | 3.2 | 0.0013 |
| Ex. II | 2.70 | 3.1 | ------ | ------ | 3.3 | ------ |
| | ------ | 3.1 | ------ | ------ | 3.4 | ------ |
| Average | 2.72 | 3.18 | 0.0008 | 2.74 | 3.28 | 0.0014 |

As seen in Table I, the copper bonding was satisfactory in all three panels, though it was best in Example II, probably due to the pre-bonding of the copper foil to polyethylene layer C at 390° F.

The electrical data in Table II show that all three panels are excellent, since the dielectric constants in the perpendicular direction were between 2.70 and 2.80, and in a parallel direction were between from 3.4 down to 2.4, whereas the dissipation factor was about 0.0005 to 0.0008 when dry, and 0.008 to 0.0014 when wet. Panel 2 of Example I exhibited the best over-all electrical properties, especially as to dielectric constant, in either direction.

Instead of bonding oxide-coated copper foil to the polyethylene, other hydrocarbon polymers, such as polypropylene, polyisobutylene, butyl rubber (high isobutylene-low isoprene rubber), or isobutylene-styrene copolymers, in sheet or film form can be bonded to the oxide-coated copper surface, generally merely by a hot-pressing or hot rolling or calendering, or by use of adhesives if desired.

Any number of these laminates, after curing, especially those having polyethylene or polypropylene or isobutylene-styrene copolymer as outer layers on both sides, can be laminated together, a few at a time, or all at once, by hot pressing, to obtain sheets, slabs, blocks, etc. of any desired thickness.

EXAMPLE IV

A panel of 12 plies of glass fiber cloth was laid up in a mold with a resinifiable mix as described in Example I, and was given a B-stage cure of 6 minutes at 265° F. in a press. A sheet of oxide-coated copper foil was coated on one side with the same resinifiable mix, and similarly given a B-stage cure. Then this B-staged resin coated copper foil was placed on the B-staged glass cloth laminate and press cured 40 minutes at 325° F. An excellent bond was produced.

EXAMPLE V

A 1½ mil film of low density polyethylene (about 20,000 mol wt.) was hot pressed onto one side of a strip of oxide-coated copper foil. After cooling, this strip was completely immersed in hot aqueous (10%) solution of $FeCl_3$, with agitation, till the black oxide coating was etched from the side of the copper foil not coated with polyethylene. It was then thoroughly rinsed in hot water and dried. In this form, it can be packaged in stacks of sheets, or rolled up on a drum, with or without inter-leaving with cellophane, Mylar, or Holland cloth, and stored or shipped, ready for use at any time in bonding onto any type of panel, i.e. paper or glass cloth laminate bonded with the preferred polydiene resins of this invention, or with other resins, e.g. polyesters, epoxies, phenol-aldehyde, etc.

EXAMPLES VI–XI

Example V was repeated except replacing the LD (low density) polyethylene film by the following hydrocarbon film materials:

| Example: | Film material |
|---|---|
| VI | HD polyethylene, 4 mils (Marlex). |
| VII | Polypropylene, 1 mil. |
| VIII | VII plus LD polyethylene, 1½ mils. |
| IX | Like VIII plus a wet film of polydiene oil resin mix (as in Ex. I) then later cured to a B-stage. |
| X | Like VI (HD polyethylene) plus resin mix as in IX. |
| XI | Polydiene oil resin mix alone cured to B-stage. |

These coated copper foils were all etched to clean copper (to remove the black oxide) on one side, but the immersion in etching solution did not harm the hydrocarbon-polymer-coated side. The products of Examples V–XI can all be bonded onto rigid panels for use in preparing printed circuits, but can also be applied to other uses, e.g. laminated in a plurality of layers with alternate copper foils connected electrically to make condensers; or for coating onto wooden or plastic gutters instead of using expensive solid copper gutters, as well as numerous other uses.

EXAMPLE XII

The product of Example V was bonded onto B-stage cured glass cloth laminate made as in Example IV, and when hot-press cured, gave an excellent bond, and good electrical properties.

Having set forth the general nature and specific embodiments of the present invention, the true scope is now particularly pointed out in the appended claims.

What is claimed is:

1. A laminate consisting essentially of a reinforcing element impregnated with a resinifiable mix partially polymerized to a B-stage and bonded to the surface of a black copper oxide surfaced copper foil, said resinifiable mix containing a conjugated $C_4$–$C_6$ diolefin polymeric oil, an organic peroxide catalyst, and a crosslinking agent selected from the group consisting of styrene, vinyl toluenes, divinyl benzene, dimethyl styrenes, halogenated styrenes, acrylic and methacrylic acid esters of monohydric alcohols, alkyl fumarates, diallyl phthalate, vinyl stearate and mixtures thereof and said laminate formed by subjecting the said impregnated mix to a temperature of between about 250° and about 350° F. for between about 1 and about 120 minutes to form a B-stage polymer which is a soft gel and is substantially insoluble in hydrocarbon solvents, said partial polymerization being carried out while bonding a surface of said resinifiable mix impregnated reinforcing element with the surface of a black copper oxide surfaced copper foil.

2. A composition of matter as in claim 1 wherein the reinforcing element is fiber glass.

3. A composition of matter as in claim 1 wherein the resinifiable mix contains as the conjugated $C_4$–$C_6$ diolefin polymeric oil, the polymer of between about 75% to 100% of butadiene with between about 25% to 0% of styrene.

4. A composition of matter as in claim 1 wherein the resinifiable mix contains a copolymer oil of about 80% butadiene and about 20% styrene; styrene, divinyl benzene, dicumyl peroxide, the reinforcing element is fiberglass cloth, and the partial polymerization is carried out at about 250% F. for about 4 minutes.

5. A process for the formation of laminates consisting essentially of impregnating a reinforcing element with a resinifiable mix containing a conjugated $C_4$–$C_6$ diolefin polymeric oil, an organic peroxide catalyst, and a crosslinking agent selected from the group consisting of styrene, vinyl toluenes, divinyl benzene, dimethyl styrenes, halogenated styrenes, acrylic and methacrylic acid esters of monohydric alcohols, alkyl fumarates, diallyl phthalate, vinyl stearate and mixtures thereof and partially polymerizing the impregnated mix to a B-stage by subjecting said impregnated mix to a temperature between about 250° and about 350° F. for between about 1 and about 120 minutes, to form a B-stage polymer which is a soft gel and is substantially insoluble in hydrocarbon solvents, said partial polymerization being carried out while bonding a surface of said resinifiable mix impregnated reinforcing element with the surface of a black copper oxide surfaced copper foil.

6. A process as in claim 5 wherein the reinforcing element is fiber glass.

7. A process as in claim 5 wherein the resinifiable mix contains as the conjugated $C_4$–$C_6$ diolefin polymeric oil, the polymer of between about 75% to 100% of butadiene with between about 25% to 0% of styrene.

8. A process as in claim 5 wherein the resinifiable mix contains a copolymer oil of about 80% butadiene and about 20% styrene; styrene, divinyl benzene, dicumyl peroxide, the reinforcing element is Fiberglas cloth, and the partial polymerization is carried out at about 250° F. for about 4 minutes.

References Cited by the Examiner

UNITED STATES PATENTS

| | | | |
|---|---|---|---|
| 2,226,589 | 12/1940 | Symers | 154—46 |
| 2,317,858 | 4/1943 | Soday | 260—669 |
| 2,551,591 | 5/1951 | Foord | 154—43 X |
| 2,606,163 | 8/1952 | Morris et al. | 260—45.5 X |
| 2,614,089 | 10/1952 | Harrison et al. | 260—45.5 |
| 2,635,975 | 4/1953 | Peters. | |
| 2,716,268 | 8/1955 | Steigerwalt | 154—106 |
| 2,805,181 | 9/1957 | Groff et al. | 161—203 |
| 2,884,161 | 4/1959 | Hurd et al. | 154—43 |
| 2,892,972 | 6/1959 | Ross | 260—45.5 X |
| 2,909,443 | 10/1959 | Wolinski | 117—13 |
| 2,927,047 | 3/1960 | Schulde et al. | |
| 2,937,665 | 5/1960 | Kennedy | 154—43 X |
| 2,955,974 | 10/1960 | Allen et al. | 154—43 |
| 2,965,952 | 12/1960 | Gillett et al. | |
| 3,018,266 | 1/1962 | Lumberg | 260—45.5 X |
| 3,024,813 | 3/1962 | Sear et al. | 156—110 |
| 3,051,695 | 8/1962 | Warner et al. | 260—294.8 |
| 3,079,295 | 2/1963 | Slotterbeck et al. | 161—204 |
| 3,117,100 | 1/1964 | Cox et al. | 260—880 |

JACOB H. STEINBERG, *Primary Examiner.*

CARL F. KRAFFT, EARL M. BERGERT, *Examiners.*